3,051,626
Patented Aug. 28, 1962

3,051,626
AMINOIMINOMETHANE SULFINIC ACID TUMOR-INHIBITORY PROCESS AND PHARMACEUTICAL COMPOSITION
Koppaka V. Rao, Pine Brook, N.J., assignor to Chas. Pfizer & Co., Inc., New York, N.Y., a corporation of Delaware
No Drawing. Filed July 1, 1959, Ser. No. 824,203
7 Claims. (Cl. 167—78)

This invention relates to a method for inhibiting the growth of tumors and to a composition useful in such treatment. More specifically, it relates to a method for inhibiting malignant tumor growth in animals, including man.

Although the field of cancer therapy has been the subject of intensive study, particularly in recent years, so far extremely few effective substances have been found. Any extension of the range of available agents therefore represents a significant contribution to the knowledge of this important subject.

It has now been discovered that the N-substituted and unsubstituted aminoiminomethanesulfinic acids and their physiologically tolerated salts and esters possess remarkably high tumor-inhibitory activity. These valuable compounds have the general formula

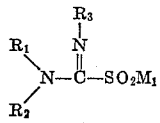

or

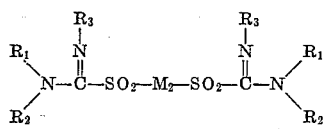

where $R_1$, $R_2$ and $R_3$ may be hydrogen, alkyl, aryl or aralkyl; $M_1$ may also represent any one of these groups or may instead represent an alkali metal ion or a radical derived from a pharmaceutically acceptable organic nitrogen-containing base by addition of a proton; and $M_2$ may be a pharmaceutically acceptable alkaline earth metal ion.

$R_1$, $R_2$ and $R_3$ may, for example be hydrogen, alkyl containing from 1 to 18 carbon atoms, hydroxyalkyl containing from 2 to 4 carbon atoms, phenyl or phenylalkyl in which the alkyl group contains up to 4 carbon atoms; $M_1$ may be any of these or may instead be sodium, potassium, lithium; mono-, di- or trialkanolammonium in which the alkanol groups contain from 2 to 4 carbon atoms; mono-, di- or trialkylammonium in which the alkyl groups contain up to 12 carbon atoms; piperidinium, pyrrolidinium, morpholinium, pyrrolinium, or N-alkylderivatives thereof in which the alkyl group contains up to 3 carbon atoms; and $M_2$ may be calcium or magnesium.

Some of these compounds are available commercially, while the others are readily prepared by methods well known to those skilled in the art. They exhibit significant anti-tumor activity against Crocker sarcoma 180 in mice. According to the procedure described by Reilly et al. (Cancer Research, vol. 13, No. 9, pages 684–7, September 1953) the substance under test is dissolved in sterile 0.85% aqueous saline. Small, uniformly cut pieces of seven-day-old tumor S–180 are implanted subcutaneously in the axillary region of Swiss white mice weighing 18 to 22 g. Each animal receives one implant, and the animals are divided into groups of six each. Intraperitoneal administration of the solution under test in doses of 0.5 cc. twice daily is begun 24 hours after implantation of the tumor and continued for a total of 13 injections. One group from each donor tumor is maintained as a control and receives injections of 0.85% saline. On the 8th day after tumor implantation the surviving animals are weighed to provide a measure of the toxic effect of the drug. The animals are then sacrificed and the tumors are excised and weighed. The weights for each group are averaged and the averages for the treated animals are expressed as percentages of the averages for the control groups. In this test it is found that the compounds of the present invention retard tumor growth to a marked degree at tolerable dosage levels.

These compounds also exhibit significant activity against mammary adenocarcinoma CA–755 according to the procedure of Gellhorn et al. (Cancer Research, Supplement III, page 38, 1955) in which treated groups of ten animals each are employed together with untreated controls. Dosage is 0.5 cc. daily in all cases. Therapy is initiated one day after transplantation of the tumor and is continued for 12 days. At the conclusion of the experiment the animals are weighed and sacrificed, and the tumors are excised and weighed. The compounds of the present invention are found to possess remarkably high potency for inhibiting growth of the tumors at tolerated dosages. Furthermore, even where the tumor is permitted to become established by delaying the initiation of treatment for 6 days, retardation of growth is achieved. In addition to intraperitoneal administration, treatment by the oral route is also effective.

The compounds of the present invention are likewise effective in inhibiting growth of human sarcoma HS No. 1 in a heterologous host. The tumors, cultivated in rats by Chen's technique (Cancer Research, vol. 14, page 660, 1954), are excised and sterilized by washing with a solution containing penicillin and dihydrostreptomycin. The tumors are next minced and suspended in buffered glucose Ringer solution at a concentration of 80% tumor tissue. Rats previously exposed to 150 R of X-radiation and treated with cortisone acetate are then injected subcutaneously in the flank with one ml. of the above-described tumor suspension. The animals receive the first treatment with the compound under test by intraperitoneal injection on the second day after tumor-implantation, and daily doses are provided thereafter until 24 hours prior to sacrifice on the thirteenth day. In every case control groups of tumor-implanted rats are maintained. At the time of sacrifice the tumors are excised, divested of connective tissue, and weighed. As before, the average tumor weight in the treated animals is reported as a percentage of the average tumor weight in the control animals. Here again, the compounds of the present invention are found to significantly retard growth of the tumors at tolerated dosage levels.

Like many carcinostatic agents, these compounds are somewhat toxic substances. However, therapeutic doses can be administered without substantial adverse effect. It has been generally agreed that survival rates of 4/6 in the S–180 test, 7/10 in the CA–755 test and 5/8 in the HS–1 test represents the minimum acceptable. In the case of aminoiminomethanesulfinic acid, for example, these criteria are met or exceeded at dosage levels as high as 125–300 mg. per kg. of body weight, with marked retardation of tumor growth. Although the long term effect of the compounds of the present invention in humans will not be known for some time, their proven tumor-inhibitory ability in the tests described strongly indicates their value in the therapy of malignant tumors such as sarcomas, lymphomas and carcinomas in human beings.

These substances exhibit very high effectiveness when administered by either the oral or the parenteral route, but the oral route will sometimes be preferred because of its convenience.

Various pharmaceutical preparations can be advantageously compounded which contain the active substance along with liquid or solid diluents. Solid preparations for extemporaneous dilution may be formulated employing various buffering agents as well as local anesthetics and other medicinal agents such as antibiotics, hypnotics, analgesics, etc., and inorganic salts to afford desirable pharmacological properties to the composition. Since these active substances are stable and widely compatible, they may be administered in solution or suspension in a variety of pharmacologically acceptable vehicles, including water, propylene glycol, diethylcarbonate, glycerol, or oils such as peanut oil or sesame oil.

Doses of the order of 50 to 500 mg./kg. of the compounds of the present invention are highly effective in inhibiting tumors in animals, and in human patients doses in the range of at least about 1 to 50 mg./kg. will be desirable. Therefore, the concentration of the active ingredient in the carrier will usually be at least about 0.1%.

In some cases, particularly at the higher dosage levels, it may be desirable to employ combinations of some of the compounds of this invention. For example, in order to avoid sodium imbalance, combinations of the sodium salt with the calcium or potassium salt or with the salt of an organic base may be advantageously utilized for cancer therapy. In addition, these active substances may be employed in combination with one or more other carcinostatic agents. For this purpose, compositions containing from 10 to 90% of the compounds of the present invention are useful. Known carcinostatic agents which may be employed in such combinations include the nitrogen mustard type carcinostats, 6-mercaptopurine, 8-azaguanine, urethane, 6-diazo-5-oxo-$l$-norleucine, azaserine, triethylenemelamine, mitocycin C, triethylenephosphoramide, 1,4-dimethylsulfonyloxybutane, the carcinostatic folic acid analogs, ethyl carbamate, and the like.

The following examples are provided by way of illustration, and are not intended to limit this invention, the scope of which is indicated by the appended claims.

EXAMPLE I

Aminoiminomethanesulfinic acid is tested for effectiveness in inhibiting the growth of adenocarcinoma CA–755 according to the procedure of Gellhorn et al. (loc. cit.). Administration is by the intraperitoneal route in each case. Results obtained are given in Table 1.

*Table 1*

| Dosage mg./kg. | Body Wt. Change, g. treated/control | Survival Rate, treated animals | Tumor Wt. treated/control, percent |
| --- | --- | --- | --- |
| 125 | −3/+2 | 9/10 | 26 |
| 100 | −1/+1 | 10/10 | 30 |
| 75 | 0/+1 | 10/10 | 53 |

EXAMPLE II

The experiment of Example I is repeated, administration of the drug this time being by the oral route rather than intraperitoneal, with results as given in Table 2.

*Table 2*

| Dosage mg./kg. | Body Wt. Change, g. treated/control | Survival Rate, treated animals | Tumor Wt. treated/control, percent |
| --- | --- | --- | --- |
| 200 | −2/+3 | 10/10 | 42 |
| 150 | −1/+1 | 10/10 | 45 |
| 100 | −2/+1 | 10/10 | 53 |

EXAMPLE III

The experiments of Examples I and II are repeated, this time permitting the tumor to become established for 6 days before the drug administration is instituted. Results are reported in Table 3.

*Table 3*

| Dosage mg./kg. | Body Weight Change, g. treated/control | Survival Rate, treated animals | Tumor Weight treated/control, percent |
| --- | --- | --- | --- |
| 250 intraperitoneal | −3/+2 | 8/10 | 16 |
| 200 oral | −1/+3 | 9/10 | 44 |

EXAMPLE IV

Aminoiminomethanesulfinic acid is evaluated for its effectiveness in inhibiting the growth of sarcoma HS–1, cultivated in rats by Chen's technique (loc. cit.). Results are given in Table 4.

*Table 4*

| Dosage mg./kg. | Body Wt. Change, g. treated/control | Survival Rate, treated animals | Tumor Wt. treated/control, percent |
| --- | --- | --- | --- |
| 300 | −3/+23 | 5/8 | 29 |
| 200 | +1/+23 | 6/8 | 38 |

EXAMPLE V

Aminoiminomethanesulfinic acid is evaluated for its effectiveness in inhibiting the growth of sarcoma 180 following the procedure of Reilly et al. (loc. cit.), with results as reported in Table 5.

*Table 5*

| Dosage mg./kg. | Body Wt. Change, g. treated/control | Survival Rate, treated animals | Tumor Wt. treated/control, percent |
| --- | --- | --- | --- |
| 200 | −5/−2 | 5/6 | 57 |
| 175 | −3/−3 | 5/6 | 61 |

EXAMPLE VI

The following substances are tested for their ability to retard the growth of malignant tumors according to the procedures of Examples I–V, and are found to be effective:

Aminoiminomethanesulfinic acid, sodium salt
Aminoiminomethanesulfinic acid, calcium salt
N-methylamino iminomethanesulfinic acid
N,N-diethylamino iminomethanesulfinic acid
N,N-diethylamino iminomethanesulfinic acid, diethylammonium salt
N-stearylamino iminomethanesulfinic acid, sodium salt
Amino-N-methyliminomethanesulfinic acid, potassium salt
N-methyl-N-ethylamino-N-methyliminomethanesulfinic acid, calcium salt
N-methyl-N-butylamino iminomethanesulfinic acid, magnesium salt
N,N-di-(2-hydroxyethyl)amino iminomethanesulfinic acid, lithium salt
N-phenylamino iminomethanesulfinic acid, methylammonium salt
N-benzylamino iminomethanesulfinic acid, diethylammonium salt
Aminoiminomethanesulfinic acid, methyl ester
Aminoiminomethanesulfinic acid, stearyl ester
Aminoiminomethanesulfinic acid, benzyl ester
Aminoiminomethanesulfinic acid, triethanolammonium salt
N-ethylamino N-ethyliminomethanesulfinic acid, piperidinium salt N,N-dibutylamino iminomethanesulfinic acid, morpholinium salt Aminoiminomethanesulfinic acid, N-methyl pyrrolinium salt Aminoiminomethanesulfinic acid, N-propyl pyrrolidinium salt

EXAMPLE VII

A 0.1% solution of aminoiminomethanesulfinic acid is prepared using isotonic saline as the vehicle. This solution is satisfactory for parenteral administration in retarding the growth of malignant tumors.

What is claimed is:

1. A process for retarding the growth of malignant tumors which comprises administering to a malignant-tumor bearing host a daily dosage of from about 1 to 500 mg./kilogram of body weight of a substance represented by a formula selected from the group consisting of:

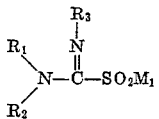

and

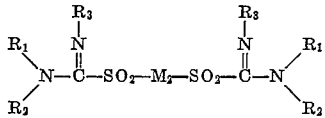

wherein $R_1$, $R_2$, and $R_3$ are each selected from the group consisting of hydrogen, alkyl containing from 1 to 18 carbon atoms, hydroxyalykyl containing from 2 to 4 carbon atoms, phenyl, or phenylalkyl wherein the alkyl group contains from 1 to 4 carbon atoms; $M_1$ is selected from the group consisting of hydrogen, alkyl containing from 1 to 18 carbon atoms, hydroxyalkyl containing from 2 to 4 carbon atoms, phenyl, phenylalkyl wherein the alkyl group contains from 1 to 4 carbon atoms, sodium, potassium, lithium; monoalkylammonium, dialkylammonium, and trialkylammonium wherein the alkyl groups contain from 1 to 12 carbon atoms; alkanolammonium, dialkanolammonium and trialkanolammonium wherein the alkanol groups contain from 2 to 4 carbon atoms; piperidinium, pyrrolidinium, morpholinium and pyrrolinium, and N-alkyl derivatives thereof wherein the alkyl group contains from 1 to 3 carbon atoms; and $M_2$ is selected from the group consisting of calcium and magnesium.

2. A process according to claim 1 wherein said substance is aminoiminomethanesulfinic acid.

3. A process according to claim 1 wherein said substance is the sodium salt of aminoiminomethanesulfinic acid.

4. A process according to claim 1 wherein said substance is the calcium salt of aminoiminomethanesulfinic acid.

5. A process according to claim 1 wherein said substance is N,N-diethylamino iminomethanesulfinic acid.

6. A process according to claim 1 wherein said substance is the diethylamine salt of N,N-diethylamino iminomethanesulfinic acid.

7. A pharmaceutical composition comprising at least about 0.1% by weight of a substance as claimed in claim 1, in a non-toxic carrier.

References Cited in the file of this patent

UNITED STATES PATENTS 2,493,471    Tillitson _____ Jan. 3, 1950

FOREIGN PATENTS 894,621    Germany _____ Oct. 26, 1953
947,553    Germany _____ Aug. 16, 1956

OTHER REFERENCES

Arora et al.: J. Sci. Ind. Research (India), vol. 13B, pp. 482–7, 1954.

Ross et al.: J. Chem. Soc., 1957, pp. 2420–2.

Dorland's Illustrated Medical Dictionary, 23rd Edition, 1957, W. B. Saunders Co., Philadelphia, Pa., "host," page 629; "tumor," pages 1482–1483.

Pfizer Spectrum, vol. 7, No. 3, March 1959, "Screening of Anti-Cancer Agents," pages 62–63, pub. by Chas. Pfizer & Co., Brooklyn, N.Y.

American Jurisprudence, Proof of Facts, Annotated vol. 3, entry "Cancer," pp. 127–134, pub. by the Lawyers Cooperative Pub. Co., Rochester, N.Y., 1959.